US00RE47953E

(19) United States
(12) Reissued Patent
Shadwell et al.

(10) Patent Number: US RE47,953 E
(45) Date of Reissued Patent: Apr. 21, 2020

(54) POINT OF SALE DISPLAY

(71) Applicant: Handy & Harman, New York, NY (US)

(72) Inventors: Peter J. Shadwell, Longmeadow, MA (US); Anthony DiSanto, Holyoke, MA (US); Nicole A. Long, Northampton, MA (US)

(73) Assignee: Handy & Harman, White Plains, NY (US)

(21) Appl. No.: 15/871,534

(22) Filed: Jan. 15, 2018

Related U.S. Patent Documents

Reissue of:
(64) Patent No.: 9,265,363
Issued: Feb. 23, 2016
Appl. No.: 14/178,816
Filed: Feb. 12, 2014

U.S. Applications:
(60) Provisional application No. 61/764,175, filed on Feb. 13, 2013, provisional application No. 61/782,624, filed on Mar. 14, 2013.

(51) Int. Cl.
*A47F 5/00* (2006.01)
*A47F 5/08* (2006.01)
*A47F 5/01* (2006.01)

(52) U.S. Cl.
CPC ..... *A47F 5/0838* (2013.01); *A47F 5/00* (2013.01); *A47F 5/01* (2013.01); *A47F 2005/0012* (2013.01)

(58) Field of Classification Search
CPC .. A47F 5/0838; A47F 5/00; A47F 5/01; A47F 2005/012
See application file for complete search history.

(56) References Cited

U.S. PATENT DOCUMENTS

| | | | | | |
|---|---|---|---|---|---|
| 269,221 | A | * | 12/1882 | Mueller | 217/23 |
| 349,255 | A | * | 9/1886 | Jackson | 211/120 |
| 362,001 | A | * | 4/1887 | Gustafson | E04B 9/16 403/387 |
| 499,549 | A | * | 6/1893 | Hunter et al. | F16L 3/24 248/72 |
| 1,100,851 | A | * | 6/1914 | Summers | 217/125 |
| RE14,279 | E | * | 4/1917 | Back | 211/51 |
| 1,320,425 | A | * | 11/1919 | Sims | 403/387 |
| 1,463,124 | A | * | 7/1923 | McConnell | 220/491 |
| 1,616,275 | A | * | 2/1927 | Olsen | 249/211 |
| 1,749,476 | A | * | 3/1930 | Fillmore | 72/458 |
| 1,784,448 | A | * | 12/1930 | Kahn | 249/211 |
| 1,909,566 | A | * | 5/1933 | Bender et al. | 396/651 |
| 1,980,416 | A | * | 11/1934 | Maguire et al. | 206/202 |
| 2,021,806 | A | * | 11/1935 | Pawsat | 292/162 |
| 2,049,884 | A | * | 8/1936 | Wurster et al. | 220/486 |
| D163,286 | S | * | 5/1951 | Jenson | D7/641 |

(Continued)

*Primary Examiner* — Patricia L Engle
(74) *Attorney, Agent, or Firm* — Alix, Yale & Ristas, LLP

(57) ABSTRACT

A point-of-sale display unit for engagement with a cantilevered support member has at least one shelf and a base member. The base member defines a track configured to receive a portion of the cantilevered support member. The unit engages with the cantilevered beam through a sliding arrangement and is rigidly maintained thereon through a combination of various mechanical forces in a position without obstructing access to the primary load held and displayed by the cantilevered system.

11 Claims, 8 Drawing Sheets

(56) References Cited

U.S. PATENT DOCUMENTS 2,697,540 A * 12/1954 Malliaris ..... 206/202
2,896,815 A * 7/1959 Longan ..... 206/202
2,954,128 A * 9/1960 Gordon ..... 211/59.3
2,979,242 A * 4/1961 Van Huis et al. ..... 294/169
2,981,440 A * 4/1961 Lilja ..... 206/202
3,032,203 A * 5/1962 Romero ..... 211/41.4
3,037,658 A * 6/1962 Schray et al. ..... 206/202
3,395,810 A * 8/1968 Johnson ..... 220/491
3,524,565 A * 8/1970 Wilson ..... 220/491
3,998,170 A * 12/1976 Gordon ..... 108/91
4,021,991 A * 5/1977 Hotz ..... 403/388
4,053,954 A * 10/1977 Chapman ..... 4/559
4,150,629 A * 4/1979 Santi ..... 108/60
4,267,997 A * 5/1981 Meier ..... 220/491
4,361,234 A * 11/1982 Hawes et al. ..... 206/505
4,456,125 A * 6/1984 Chap ..... 206/513
4,673,089 A * 6/1987 Chap ..... A47G 23/0208 211/119
5,279,441 A * 1/1994 Featherall ..... 220/485
5,449,076 A * 9/1995 Van Noord ..... 211/59.3
5,495,960 A * 3/1996 Lam et al. ..... 220/485
5,971,176 A * 10/1999 MacDonald ..... A47F 7/0042 211/183
6,027,091 A * 2/2000 Johnson ..... 248/340
6,520,354 B1 * 2/2003 Skvorecz ..... 211/181.1
7,617,941 B2 * 11/2009 Colin et al. ..... 211/59.2
8,167,258 B1 * 5/2012 Wentworth et al. ..... 248/214
8,256,637 B2 * 9/2012 Goodman et al. ..... 220/491
8,857,771 B2 * 10/2014 Streetman ..... 248/72
9,044,086 B1 * 6/2015 Johnston
2001/0011694 A1 * 8/2001 Lycett ..... 248/228.1
2006/0226314 A1 * 10/2006 Dube et al. ..... 248/228.1
2008/0124438 A1 * 5/2008 Forte et al. ..... 426/389
2008/0230499 A1 * 9/2008 Jasniy ..... 211/119
2010/0025348 A1 * 2/2010 Burgess et al. ..... 211/113
2010/0102014 A1 * 4/2010 Yang ..... 211/113
2011/0309220 A1 * 12/2011 Collini ..... A47B 73/00 248/311.2
2013/0340377 A1 * 12/2013 Shadwell ..... 52/698
2014/0048538 A1 * 2/2014 Sabounjian ..... 220/486
2014/0191097 A1 * 7/2014 Noah ..... B25H 1/02 248/214

* cited by examiner

POINT OF SALE DISPLAY

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application claims the priority of U.S. Provisional Application No. 61/764,175, filed on Feb. 13, 2013 and U.S. Provisional Application No. 61/782,624, filed on Mar. 14, 2013, the entire disclosures of which are incorporated herein by reference in their entirety.

FIELD OF THE INVENTION

The invention relates to a product display. More particularly, the invention relates to a retail point-of-sale product display for use with cantilevered support members, such as for example, I-beams.

BACKGROUND

Retail stores, such as hardware stores for example, utilize cantilevered support members such as forward extending I-beams to support and display certain materials and products on the sales floor. For example, hardware stores often employ a series of rigid I-beams that extend substantially parallel and coplanar for supporting elongated materials such as lumber, deck boards and sheathing products. Such an arrangement efficiently offers customers with an appealing view of and facile access to the displayed products. The products are accessed easily by sliding or lifting off the distal (front) end of the cantilevered I-beam.

Most hardware stores discourage or even prohibit use of floor standing retail displays positioned in front of cantilevered display systems because they impede access to displayed lumber products and can be dangerous in light of the somewhat heavy and bulky nature of the displayed planks. As such, a common drawback to the above-described cantilevered retail display system is that products associated or for use with the displayed lumber products (such as screws, nails, adhesives and insulating materials) cannot be displayed in close proximity.

DESCRIPTION OF THE PREFERRED EMBODIMENT

Figure 1:
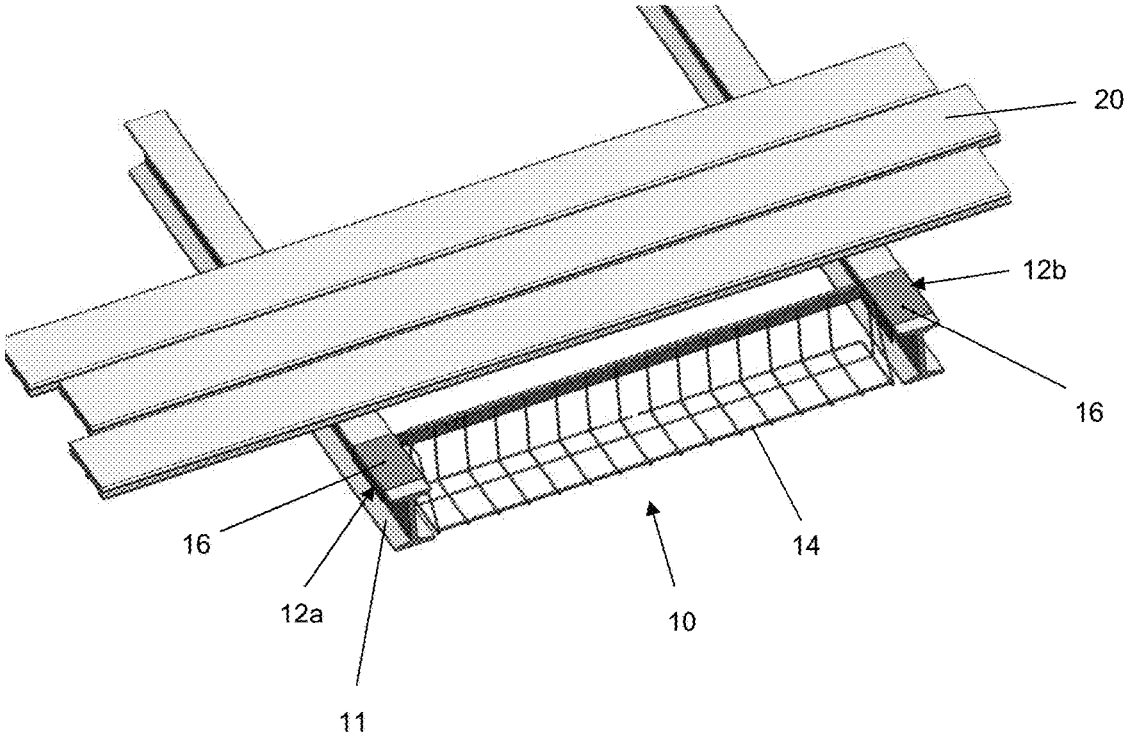
FIG. 1 is a top perspective view of a point of sale display unit engaged with a cantilevered beam system according to the disclosure.
Figure 2:
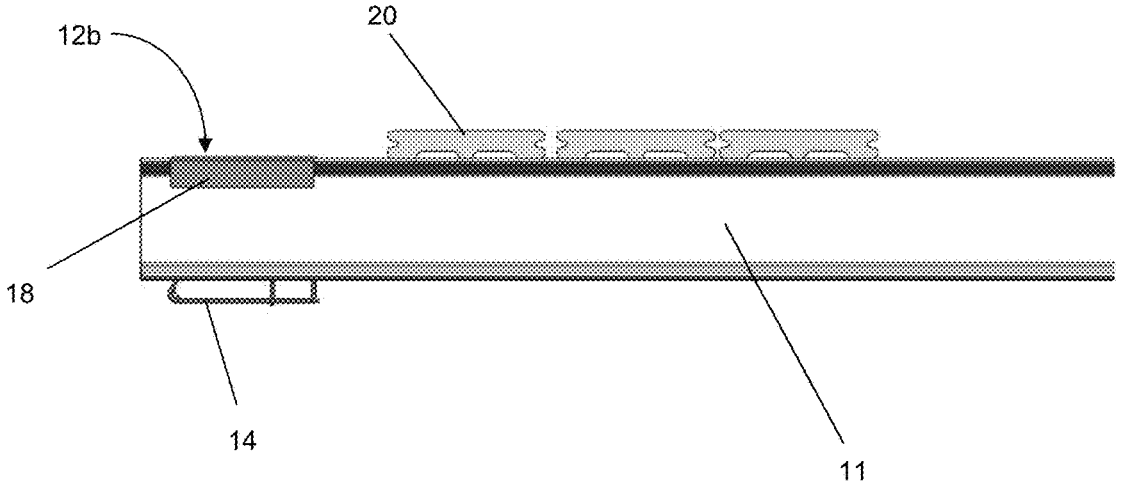
FIG. 2 is a side elevation view of the display unit engaged with the cantilevered beam system of FIG. 1.
Figure 3:
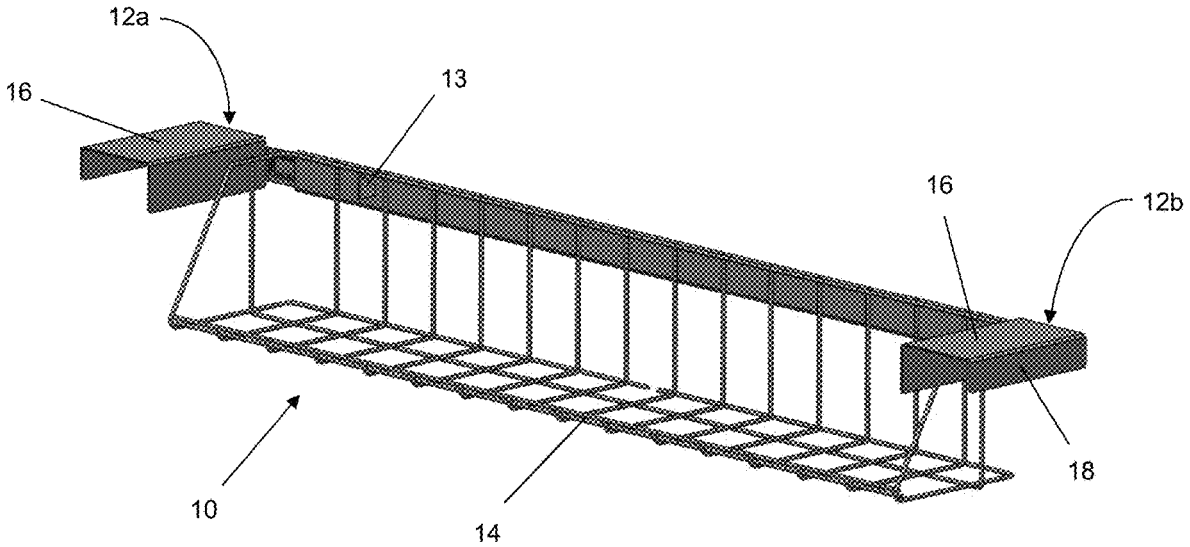
FIG. 3 is a perspective view of the point of sale display unit of FIG. 1.

FIGS. 1-3 show a first embodiment of the disclosed point of sale display unit 10 for use in conjunction with a cantilevered display system (in the form of I-beams) identified as reference numeral 11. As shown, the display unit 10 includes a pair of opposite mounting brackets 12a and 12b (collectively referred to herein as reference numeral 12) with a support shelf 14 extending therebetween. The brackets 12 are typically formed of bent or stamped steel or another suitable strong, durable and relatively rigid material. The support shelf 14 of the depicted embodiment is formed of a metallic wire, as is typically used in known retail and residential shelving. Here, the shelf 14 is attached rigidly to one of the mounting brackets 12b, via at least one gusset bracket. Other known attachment fasteners can be substituted or a permanent attachment may be achieved by welding or soldering. The other mounting bracket 12a is attached in a slidable arrangement relative to the shelf 14 and bracket 12b to accommodate various distances between adjacent cantilevered I-beams. As shown most clearly in FIG. 3, a tab 13 is incorporated into the stationary elongated support unit behind the shelf 14 and deflects into the sliding element attached to the sliding bracket 12a to prevent the sliding bracket 12a from being slid completely out of the assembly.

As shown, the display unit 10 is sized and shaped to extend between adjacent I-beams with the brackets 12 bent or otherwise formed to tightly mate with and lie flat on the contour of the upper I-beam surface. The upper base portion 16 of the bracket is sized to fit securely along the upper I-beam surface with the side wings 18 extending over the edge of the upper I-beam surface. The depicted embodiment includes side wings 18 that are bent at approximately 90° relative to the flat upper base 16. However, preferred embodiments exist wherein the side wings 18 are bent acutely inward in a configuration for tightly mating with the outer contour of the upper portion of the I-beam, thereby minimizing undesirable movement of the unit 10 after engagement with the I-beam. In this embodiment, a "track" is defined between the base 16 and wings 18 which corresponds to the I-beam shape, thereby increasing rigidity when attached. The display unit 10 is supported exclusively by the cantilevered I-beams 11 that are already in place for holding the planks 20.

When engaged with the cantilevered I-beam display system as depicted in FIGS. 1 and 2, the disclosed display unit 10 converts empty, previously unusable space between adjacent I-beams (under the planks 20) into a display shelf for smaller complimentary items. Because the display unit 10 hangs below the plane within which the planks 20 lie and does not extend beyond the distal ends of the adjacent I-beams 11, there is no obstruction to the displayed planks.

The depicted unit 10 can be specially designed for use with different cantilevered display systems. Properties of the unit can be altered, such as for example length, depth, shelf configuration, and size and shape of end brackets.

With reference to FIGS. 4-8, another embodiment of display unit 100 for use with a cantilevered display system is disclosed. This embodiment is configured for engagement with the lower flange of a cantilevered I-beam, rather than being supported on the upper flange. Also, this embodiment may be attached to a single I-beam rather than extending between two adjacent I-beams like the embodiment shown in FIGS. 1-3. The display unit 100 comprises an elongate support member 102 secured to a left shelf 106a and a right shelf 106b (collectively referred to herein as reference numeral 106). The respective shelves may be joined to each other can be attached as a single frame unit or two separately secured pieces. Of course the depicted size and shape of the shelves is non-limiting.

As shown, the support member 102 is formed of an elongate steel plate bent acutely inward to form a sheath with a generally flat base 108 and two opposing inwardly extending wings 110. The base 108 and wings 110 define an inner track 112 extending rear-ward (proximal) and having a parallel upper slot 114 defined between the respective edges of the wings 110.

Figure 6:
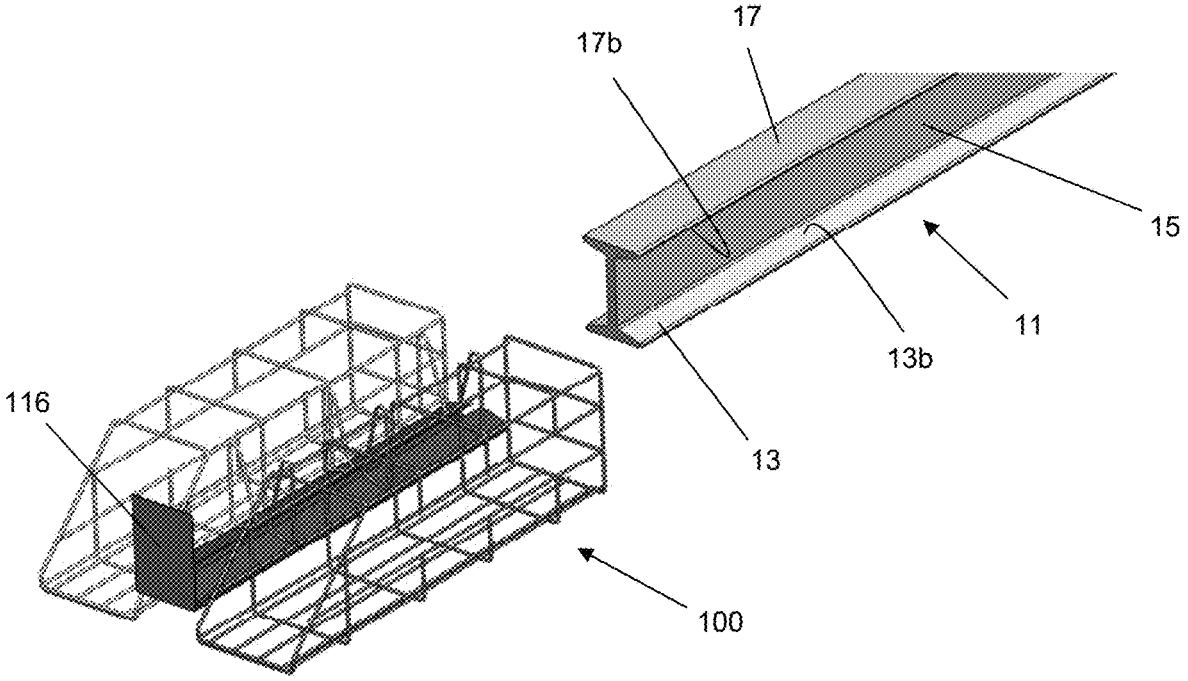
FIGS. 6-8 depict representative operative steps of attachment and use of the display unit of FIGS. 4 and 5 with a cantilevered beam system.
Figure 7:
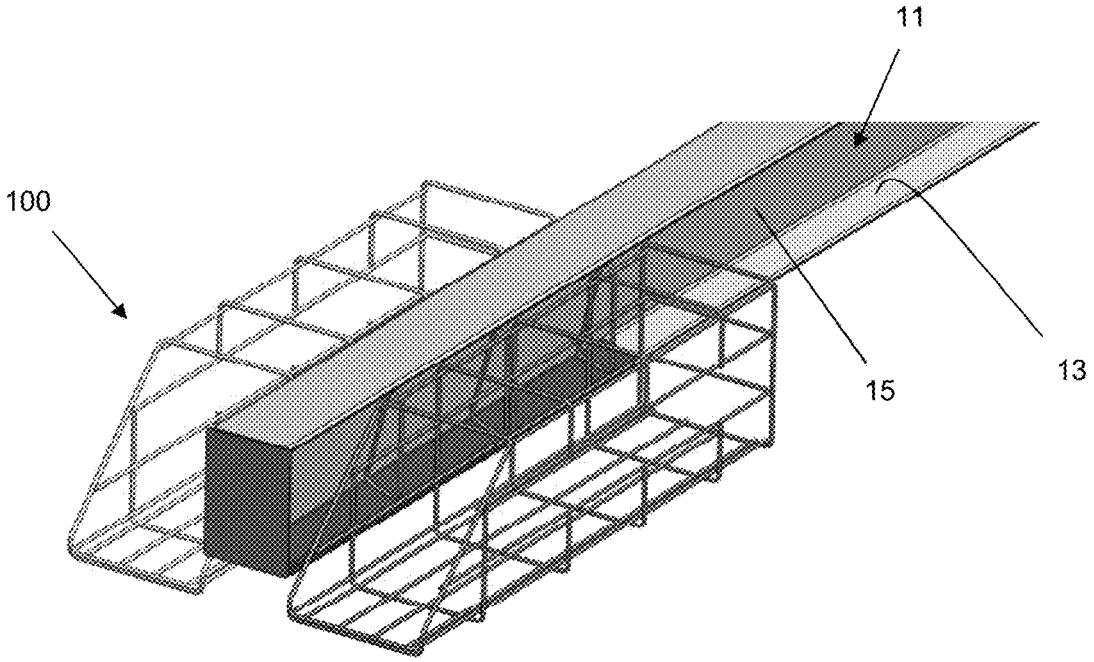
Figure 8:
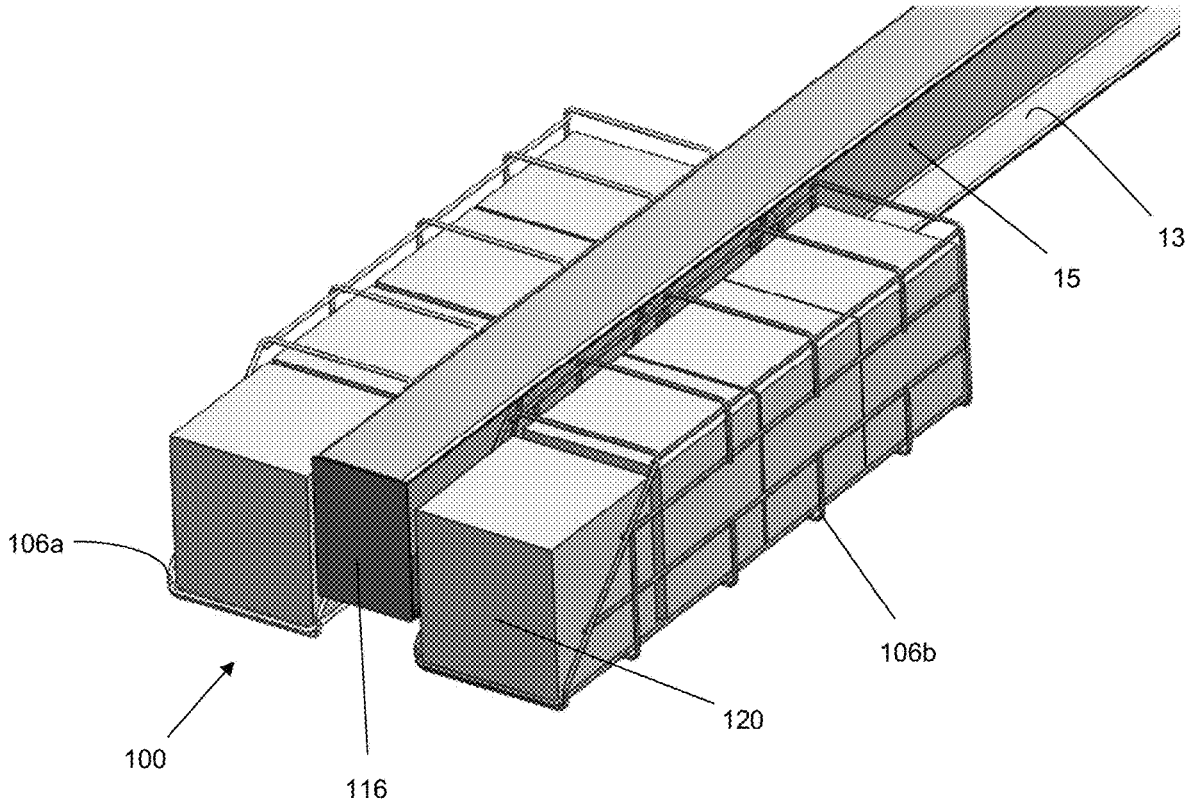

As depicted in FIGS. 6-8, the display unit 100 can optionally include a front plate 116 positioned at the distal end of the support member 102. The plate 116 serves as a stop for the front edge of the I-beam and may additionally be designed for improved aesthetics of the system or labeling.

Figure 4:
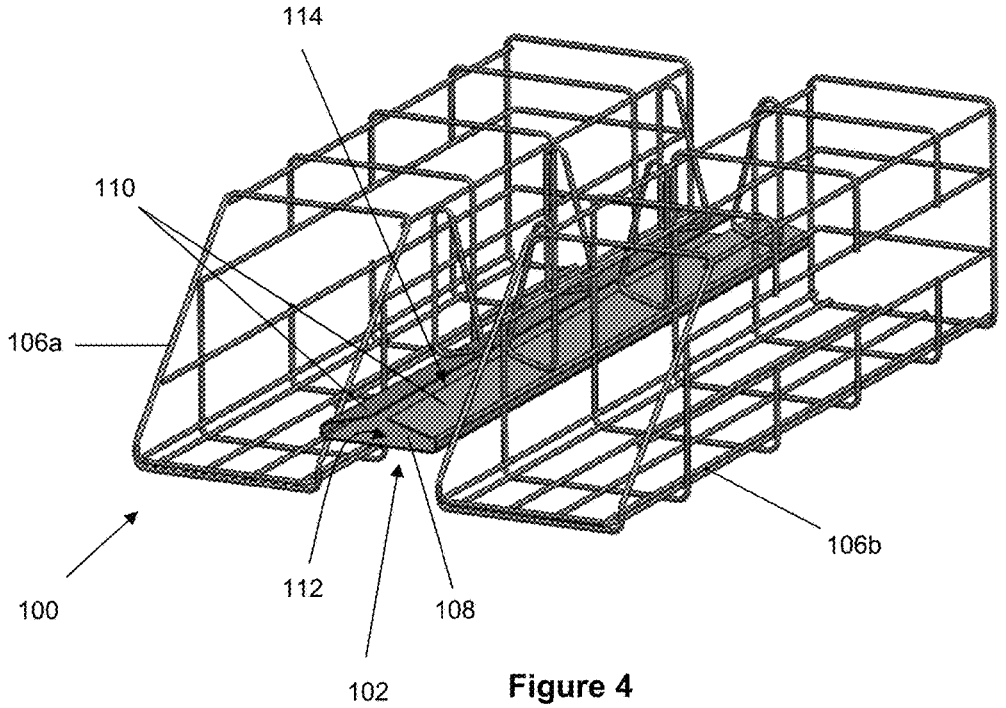
FIG. 4 is a perspective view of another embodiment of the disclosed point of sale display unit.
Figure 5:
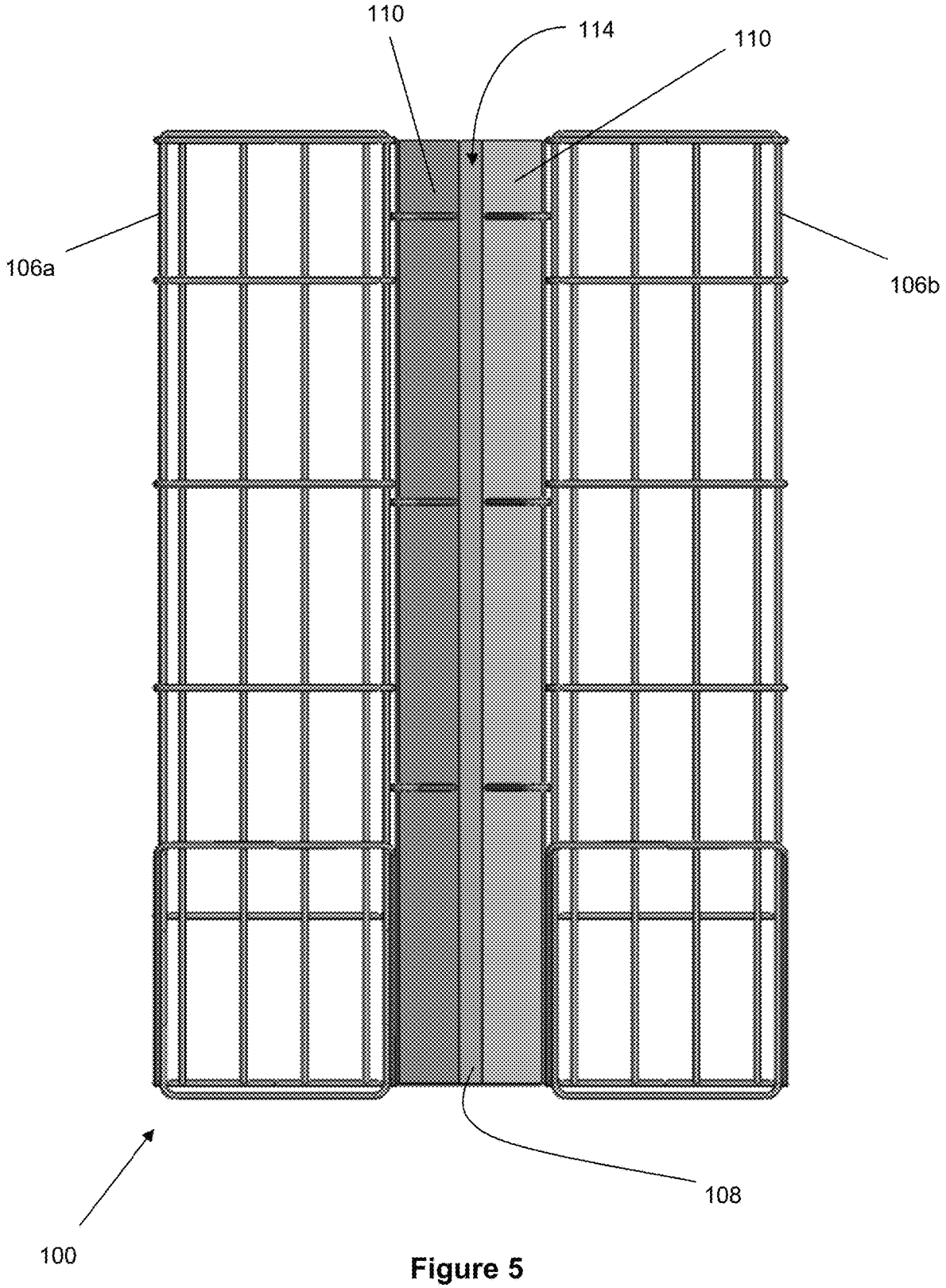
FIG. 5 is a top elevation view of the display unit of FIG. 4.

FIG. 5 is a top view of the display unit of FIG. 4, showing the generally central base 108 secured to the respective shelves 106a and 106b. As can be seen, each wing 110 extends inward and terminates at a position laterally spaced from the opposite wing, defining the upper slot 114 therebetween.

FIGS. 6 and 7 depict a representative sliding engagement of the display unit 100 of FIG. 8 with a single cantilevered I-beam 11. As shown, the unit 100 is secured to the I-beam 11 by sliding engagement of the I-beam lower flange 13 with the base track 112. The I-beam web 15 extends through the base slot 114 during installation and use. With reference to FIG. 12, the front plate 116 acts as a barrier or stopper at the distal end of the track 112 during installation, in addition to serving an aesthetic function.

The size and shape of the track 112 and slot 114 correspond generally to the outer profile of the I-beam lower flange 13 and web 15, resulting in a strong and generally rigid slidable engagement. The wings 110 may flex outward from the track 112 to accommodate the lower flange 13 and web 15 during rearward sliding installation, thereby strengthening the mechanical attachment between the support member 102 and I-beam 11 and allowing attachment to a variety of beam sizes, shapes and configurations.

FIG. 8 depicts the display unit 100 attached to an I-beam 11 with boxes 120 loaded onto the shelves 106a and 106b for retail display. In practice, the shelves 106 hang below the planks (like those depicted as reference numeral 20) supported on the upper flange of the I-beam 11, as can be seen. The display unit 100 utilizes previously lost space below the planks without obstructing access to or view of the planks whatsoever. Additionally, since the upper flange is not involved in the attachment, potential contact with planks being removed from the cantilevered system is eliminated.

As with the previous embodiment, the exact properties of the display unit 100 can be altered to accommodate different sizes or shapes of cantilevered I-beams as well as different retail items to be displayed.

Embodiments exist as hybrids of the FIGS. 1-3 embodiment and the FIGS. 4-8 embodiment. For example, a display unit with a shelf extending between two brackets of the general type to slidingly attach to the lower flange of an I-beam. Support members like that depicted as referenced numeral 102 in FIGS. 4-8 are attached at opposite lateral ends of the shelf. The unit is attached to the lower flanges of two spaced I-beams via sliding engagement of each support member in the proximal direction.

Figure 9:
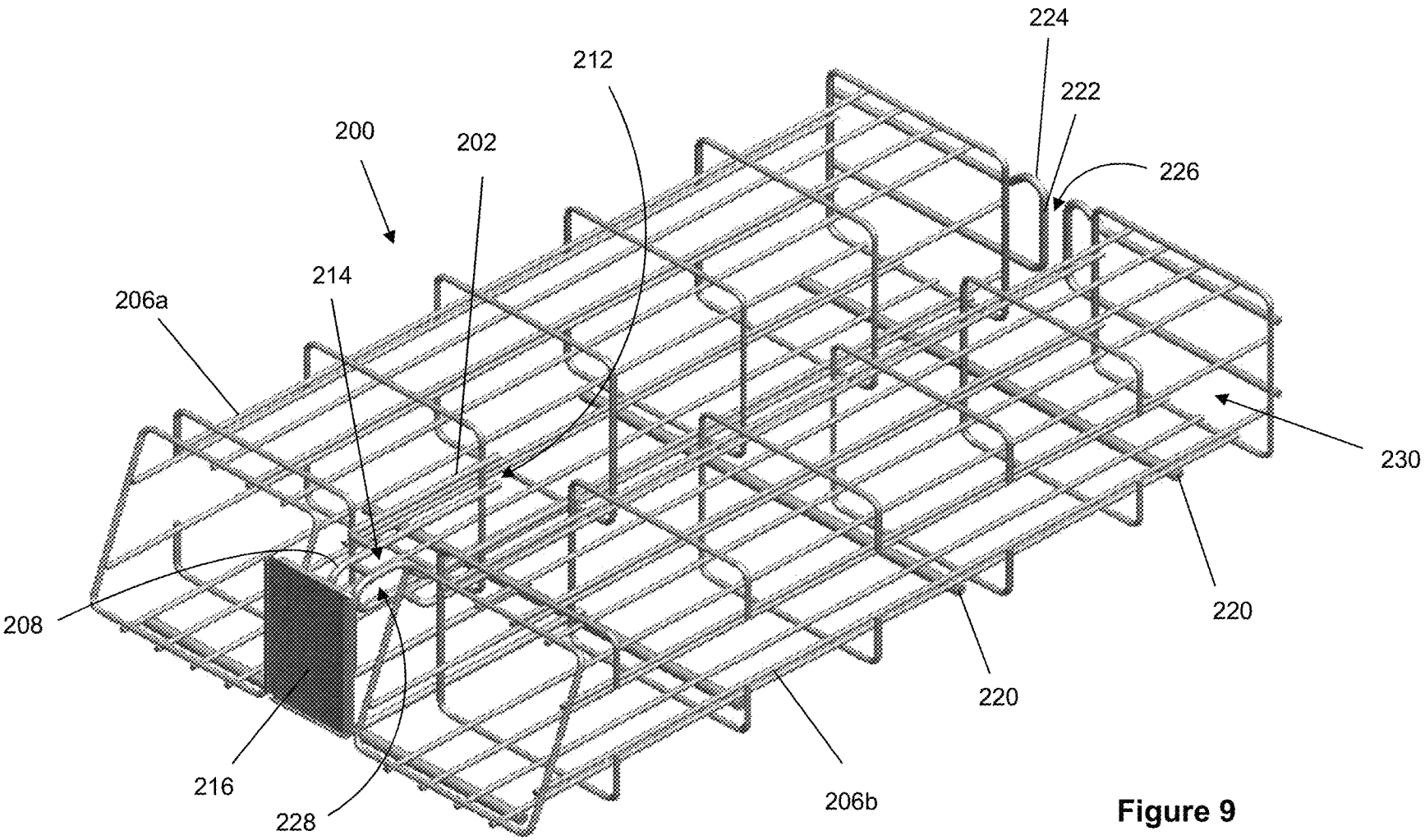
FIG. 9 is a perspective view of another embodiment of the disclosed point of sale display unit.

FIG. 9 shows an additional embodiment of the point of sale display unit 200. As depicted, the display unit 200 has two opposite side shelves, 206a and 206b (collectively referred to herein as reference numeral 206). Like the previous embodiments, the shelves 206 comprise wire frame. Crossbars 220 extending between and secured to both shelves, 206a and 206b, at their bottom ends may be included to improve stability and rigidity of the display unit 200. Rather than a support member comprising a base formed from a bent steel sheet like that depicted in FIGS. 4-8, this embodiment of display unit 200 includes a base unit 202 comprising bent wire. The base 202 extends rearward from a front end substantially parallel to and is positioned approximately midway between the respective shelves, 206a and 206b.

Figure 11:
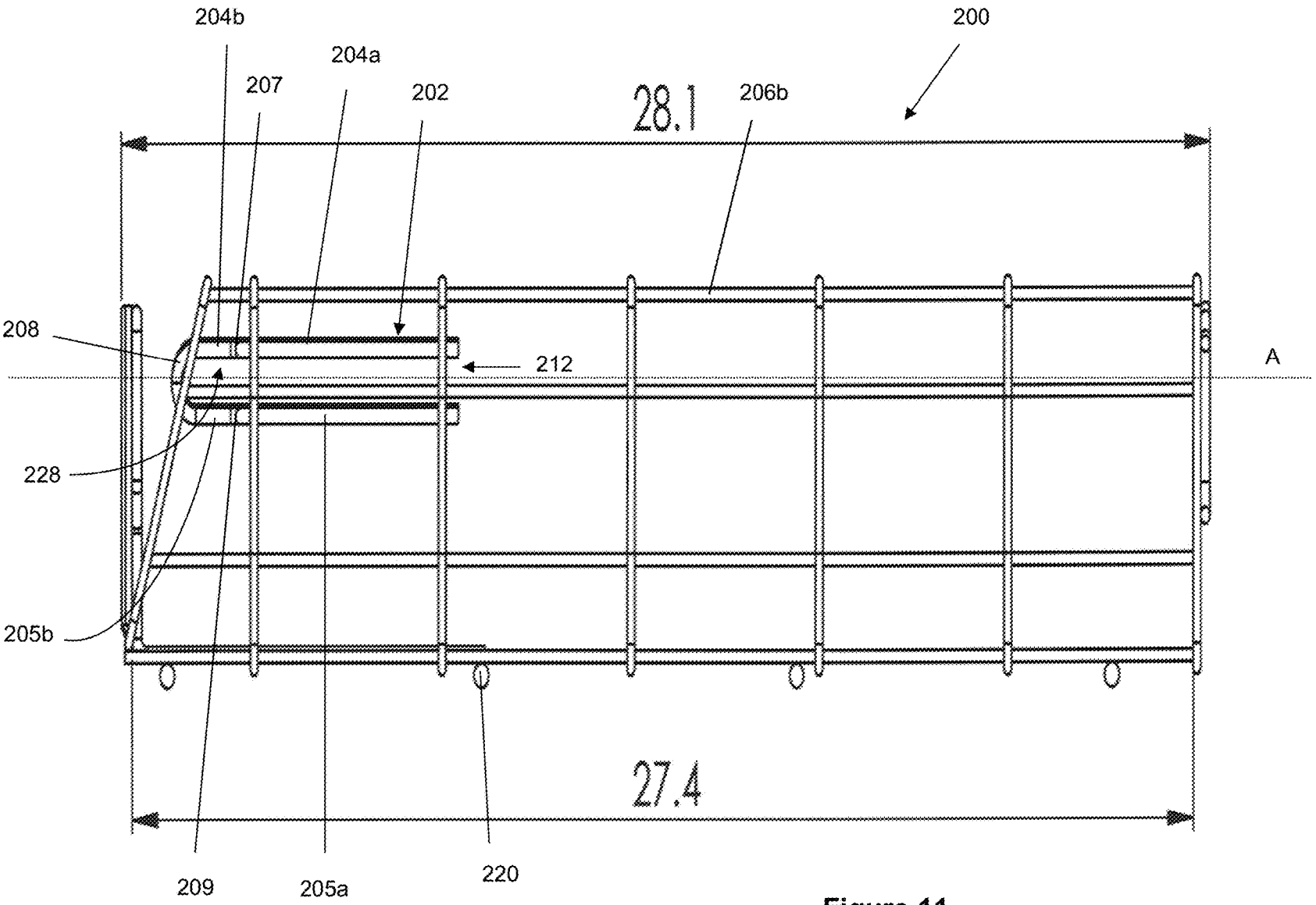
FIG. 11 is a side elevation view of the display unit of FIG. 14.

The base 202 comprises an upper portion with two opposed (left and right) generally parallel and rearward extending rear upper segments 204a and front upper segments 204b. As seen in FIG. 11, the upper segments each define an inwardly laterally extending shoulder 207 which transitions the respective rear segment 204a to the respective front segment 204b. Each of the front segments 204b transitions via a respective front bend 208 to a similarly sized and shaped lower front segment 205b in the lower base portion. The lower base portion is like in shape, size and configuration to the upper base portion, including parallel rear segments 205a and inwardly laterally extending shoulders 209 transitioning to parallel front lower segments 205b. As depicted, the upper and lower base portions are substantially identical in formation and cooperate to form a generally U-shaped unit via a front bend (discussed further below). However, this is not a requirement for the disclosed display unit.

Figure 10:
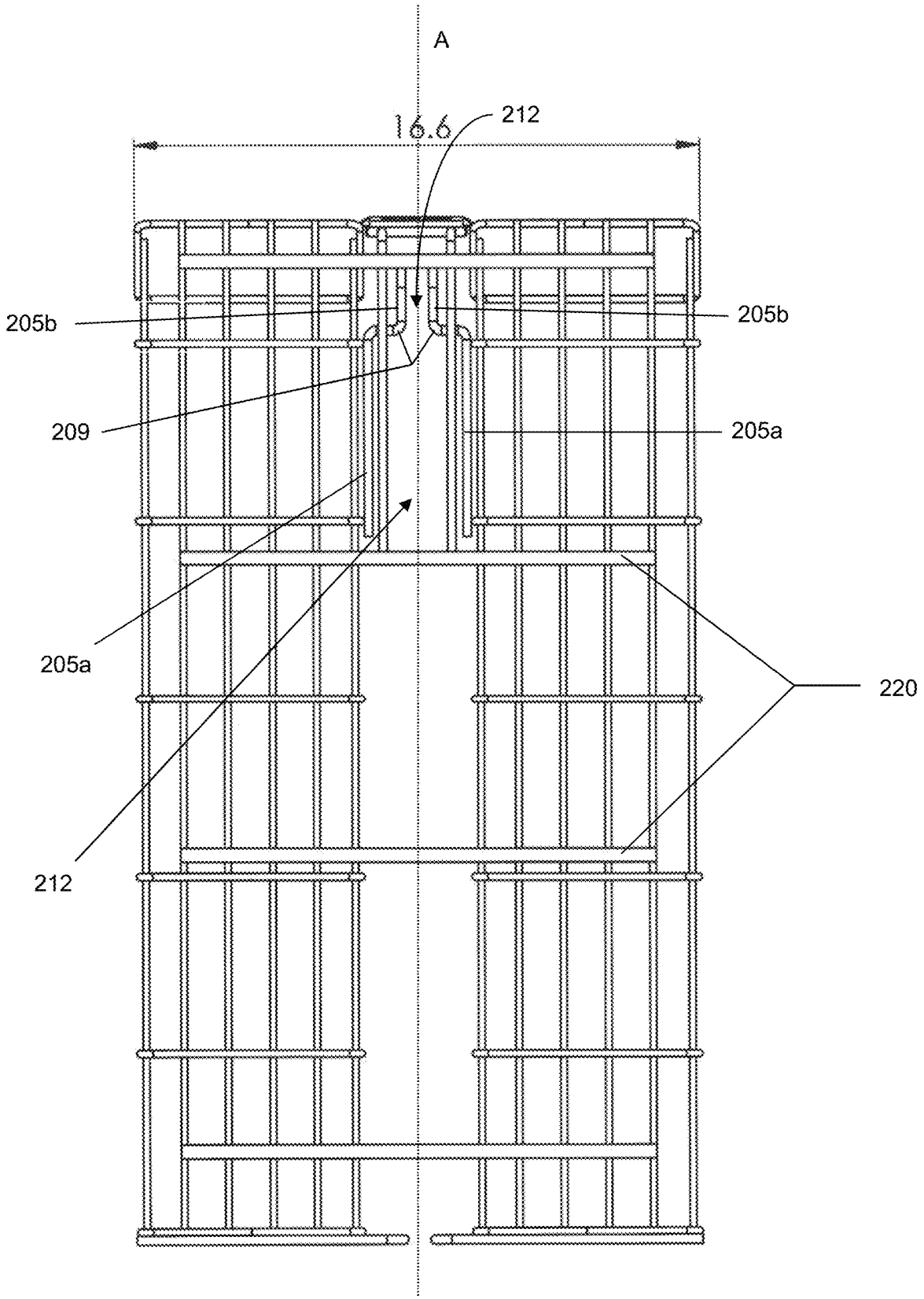
FIG. 10 is a bottom elevation view of the display unit of FIG. 14.

As depicted most clearly in the side view of FIG. 11, the base 202 comprises a pair of laterally spaced units with substantially identical U-shaped lateral profiles. Each U-shaped unit comprises an upper portion (including respective upper rear and front segments 204a and 204b) which transitions to a respective substantially parallel lower portion (including lower rear and front segments 205a and 205b) via front bend 208. As described above, and seen most clearly in the view of FIG. 10, each of the upper and lower portions comprises a rear segment (204a and 205a) that transitions laterally inward via a substantially perpendicular shoulder (209) to a front segment (204b and 205b). Essentially, each upper and lower portion collectively defines an S-shape proximal/distal contour, while combining with the respective front bends 208 to define a U-shaped lateral profile.

The base extends proximally (rearward) from its front/distal end near the front end of the display unit 200 and defines a track 212 with a substantially parallel top slot 214. In the depicted embodiment, the top slot 214 is defined by the lateral spacing between the respective U-shaped units. Thus, the slot 214 narrows toward its front end where the respective U-shaped units transition laterally inward (i.e., the lateral spacing between the respective front segments 204b and 205b). As shown, the lateral space between the shelves 206 is also open at the top.

The display unit 200 also includes a rear shoulder 222 extending laterally inward from each shelf 206 into the lateral space between the shelves. Each shoulder 222 includes an upward dimple 224 and defines a rear slot 226 therebetween. In a preferred embodiment, the lateral width of the rear slot 226 is configured to be narrower than the lateral width of a typical I-beam web (15) when the display unit 200 is in its rest state, not engaged with an I-beam. The respective shoulders 222 may actually lightly abut each other in the rest state, and be separable when expended outwardly.

The display unit 200 is secured to the I-beam 11 by sliding engagement of the I-beam lower flange 13 within the base track 212. The I-beam web 15 extends through the base upper slot 214 during installation. The respective shelves 206a and 206b, and thus shoulders 222, can flex slightly outward with application of a moderate outward force, thereby laterally expanding the rear slot 226 for receipt of the I-beam web 15. The web 15 is thereafter pinched between the rear shoulders 222 when the outward force is released and the shoulders 222 contract inward. Toward the front end of the display unit 200, the I-beam web 15 is positioned between the narrow front slot portion between the respective upper front base segments 204b in the final attached position. The configuration of the narrow front slot portion of the base 202 assists in laterally maintaining the web 15 relative to the display unit 200, thus providing improved rigidity to the unit when attached.

The upper dimples 224 are configured at a height relative to the upper base segments (204a and 204b) such that when engaged with an I-beam, the lower I-beam flange inner surface 13b rests on the upper base portion while dimples 224 abut the upper flange inner surface 17b. The resulting front-to-rear wedge-like effect with the upper and lower I-beam flanges (13 and 17), in combination with pinching of the I-beam web 15 between the rear shoulders 222 provides a tight, rigid, strong and stable attachment to the cantilevered I-beam 11.

In this embodiment, the front bend or apex 208 in the respective U-shaped units of the base 202 define a barrier or stop at the front end of the track 212 during installation. The front bend 208 also defines a lateral thru-hole 228. Once the display unit 200 is engaged with the I-beam 11 using the "wedging" and "pinching" action as described above, a bolt or similar securing member may be positioned extending through the lateral thru-hole 228 and an appropriately positioned hole in the I-beam web 15 (not depicted) and tightened with a nut. As also depicted, the shelves 206 may include an open side slot 230 extending longitudinally across or partially across its length to allow manual advancement of packages positioned in the shelves. While not depicted, the shelves can also include a forward bias element, such as a rear spring charge, to provide a forward bias to automatically advance packages forward.

Similar to the previous embodiments, the display unit 200 can include a front plate 216 for product labeling and aesthetic purposes. The size and shape of the base track 212 and slot 214, rear shelves 222 (and rear slot 226) may be adapted to cooperate and affect the described wedging and pinching interaction with the outer profile of I-beams of different sizes. While the depicted and described embodiment of the display unit 200 primarily comprises metal wire, such as steel, this is not a limiting characteristic. Other materials may be employed in a display unit that engages with an I-beam with the described wedging and/or pinching action. Additionally, other configurations and shapes of the base and rear shoulders may be employed, such as an embodiment with a polymer molded base with an operatively designed upper slot for receipt of the I-beam web.

Similar to the embodiment of FIGS. 4-8, in use, the shelves 206 typically hang below the planks 20 that are supported on the upper flange of the I-beam 11. These embodiments of the display unit 100 and 200 include no brackets or any other element above the outer surface of the upper I-beam flange 17, and thus cause no interference with removal or replacement of planks being displayed. As these embodiments of the display unit 100 and 200 do not span the entire distance between adjacent I-beams, mechanical devices such as fork-lifts or ladder lifts may be employed for loading and unloading of the displayed planks.

Yet another embodiment of the display unit exists with a hinge or similar element to allow pivoting around a central axis A extending in the front-to-rear rear direction. Some retail cantilevered display assemblies include a plate or similar barrier obstructing the front of the I-shaped beam. Such a barrier provides a potential obstacle to sliding attachment of the base 202 and its track 212 of the display unit 200. This embodiment is configured to allow outward relative pivoting about the axis A (see FIGS. 10 and 11) such that the display unit can be fit around the front plate on the I-shaped beam, and then closed or "clamped" around the lower flange with web extending through the top slot in the base, in an attached configuration substantially the same as that of the display unit 200.

While a preferred embodiment has been set forth for purposes of illustration, the foregoing description should not be deemed a limitation of the invention herein. Accordingly, various modifications, adaptations and alternatives may occur to one skilled in the art without departing from the spirit of the invention and scope of the claimed coverage.

What is claimed is:

1. A wire display unit for engagement with a cantilevered I-beam having a longitudinal web extending between and spacing a lateral upper flange and substantially parallel lower flange, comprising:

an elongate base extending from a front end to a rear end and having an upper portion spaced from a lower portion defining a track therebetween, the upper portion defining an elongate open upper slot extending the entirety of the track;

at least one elongate shelf for storing objects, the at least one shelf extending from an open front end to a rear end, the at least one shelf being rigidly secured to the base; and a pair of laterally spaced upper shoulders positioned rear of the base and longitudinally offset from the track, the space between the respective lateral shoulders defining a rear longitudinal slot being substantially laterally aligned with the base slot, wherein the display unit is attachable to the cantilevered I-beam by sliding the display unit in the rearward direction with the lower flange of the I-beam being inserted within the track and the web of the I-beam extending through the base upper slot and rear longitudinal slot with the upper shoulders abutting the upper flange, and wherein the web has a lateral width and the rear slot is narrower than the web width when the rear shoulders are in a relaxed state, and the rear shoulders are outwardly flexible to an expanded position for accommodating the web during installation to securely attach the display unit to the I-beam.

2. The display unit of claim 1, wherein the spaced shoulders pinch the web when returned to the relaxed position from the expanded position with the web positioned in the rear slot.

3. The display unit of claim 1, wherein the base is positioned between two opposed shelves.

4. The display unit of claim 1, wherein the base terminates at its rear end which is forward of the rear end of the at least one shelf.

5. The display unit of claim 1, wherein the base comprises two substantially parallel laterally spaced U-shaped members.

6. The display unit of claim 1, wherein each of the at least one shelf extends rearward substantially parallel to the base.

7. The display unit of claim 1, wherein each of the at least one shelf comprises a bias member positioned rear of the front open front for providing bias in the frontward direction.

8. The display unit of claim 1, wherein the base comprises a pair of parallel laterally spaced wire members with U-shaped lateral profiles, the space between the wire members defining the upper slot and a substantially parallel lower slot.

9. The display unit of claim 8, wherein each wire member has a front portion that transitions laterally toward the other wire member, thereby laterally narrowing the upper slot and lower slot toward the base front end.

10. The display unit of claim 9, wherein the narrowed front portion of the upper slot is sized and shaped to receive the web when installed on the cantilevered beam.

11. The display unit of claim 9, comprising a pair of parallel shelves laterally spaced from each other with the base positioned substantially parallel therebetween in rigid attachment to both shelves.

* * * * *